United States Patent [19]
Okada et al.

[11] Patent Number: 5,245,431
[45] Date of Patent: Sep. 14, 1993

[54] SYNCHRONIZING SIGNAL SELECTION CIRCUIT

[75] Inventors: Hisao Okada, Nara; Shigeyuki Uehira, Kashihara; Kuniaki Tanaka, Nara; Katumi Miki, Shiga; Miki Fukuyama, Nara, all of Japan

[73] Assignee: Sharp Kabushiki Kaisha, Osaka, Japan

[21] Appl. No.: 742,899

[22] Filed: Aug. 8, 1991

[30] Foreign Application Priority Data

Aug. 8, 1990 [JP] Japan .................................. 2-210608
Sep. 28, 1990 [JP] Japan .................................. 2-261482

[51] Int. Cl.$^5$ ........................... H04N 5/10; H04N 5/8
[52] U.S. Cl. ..................... 358/154; 358/153; 358/155
[58] Field of Search ............... 358/148, 149, 150, 151, 358/152, 153, 154, 155, 158, 159, 160, 166, 167, 35, 36, 37, 236

[56] References Cited

U.S. PATENT DOCUMENTS

| | | | |
|---|---|---|---|
| 4,701,796 | 10/1987 | Kamiya | 358/153 |
| 4,709,268 | 11/1987 | Akimoto et al. | 358/148 |
| 4,772,950 | 9/1988 | Furuhata et al. | 358/158 |
| 4,792,857 | 12/1988 | Akiyama | 358/236 |
| 4,870,297 | 9/1989 | Karlock | 358/153 |
| 5,132,794 | 7/1992 | Okada et al. | 358/153 |

FOREIGN PATENT DOCUMENTS 1-298875 12/1989 Japan .

OTHER PUBLICATIONS

Translation of Abstract of Japanese Appln. No. 1-298875.

Primary Examiner—James J. Groody
Assistant Examiner—Michael H. Lee

[57] ABSTRACT

In a synchronizing signal selection circuit, in response to the input of a vertical synchronizing signal extracted from a composite synchronizing signal, a control signal is generated. The control signal is in a predetermined state during a period which begins when a first predetermined time period has elapsed after the input of the vertical synchronizing signal, and which terminates when a second predetermined time period has elapsed after the input of the vertical synchronizing signal. The composite synchronizing signal is output when the control signal is in the predetermined state, and a horizontal synchronizing signal separated the composite synchronizing signal is output when the control signal is in a state other than the predetermined state.

8 Claims, 14 Drawing Sheets

SYNCHRONIZING SIGNAL SELECTION CIRCUIT

BACKGROUND OF THE INVENTION

1. Field of the Invention:

The present invention relates to a synchronizing signal selection circuit, and more particularly to a synchronizing signal selection circuit for extracting the timing of a horizontal synchronizing signal from a composite synchronizing signal. Hereinafter, the term "synchronizing signal" is abbreviated as "sync signal".

2. Description of the Background Art:

In a television system such as the NTSC (National Television System Committee) system or the PAL (Phase Alternation Line) system, only a composite sync signal in which a vertical sync signal and horizontal sync signal are combined is supplied as a sync signal to a television apparatus. As is well known, this composite sync signal is obtained by separating it from a composite video signal carried on a transmitted broadcast wave.

In a matrix type liquid crystal display (LCD) apparatus that has come into wide use in recent years, a clock signal for sampling image signals in the LCD apparatus is generated. Since this clock signal must be precisely synchronous with the horizontal sync signal when display is performed based on the image information in the above-mentioned television system, the clock signal is generated by using a PLL (Phase-Locked Loop) circuit 100 as shown in FIG. 8. The PLL circuit 100 has a loop which comprises a voltage-controlled oscillator (VCO) 101, a frequency divider 102, a phase comparator 103 and a low-pass filter (LPF) 104. It is desirable to supply the horizontal sync signal as the sync signal Sync which is the input signal of the PLL circuit 100. In the prior art, however, the composite sync signal is supplied as it is.

FIGS. 9A to 9C show composite sync signals used in the NTSC system. FIG. 9A shows a composite sync signal in a transition period from an even field to an odd field. FIG. 9B shows a portion of a composite sync signal in one field. In FIG. 9C, a composite sync signal in a transition period from an odd field to an even field is shown. As shown in FIGS. 9A and 9C, in addition to the horizontal sync signal 21, a vertical sync signal and an equalizing pulse 22 exist in the composite sync signal in the transition period from one field to the next field. The equalizing pulse 22 is inserted to equalize the waveforms of the composite sync signal in the portion of the vertical sync signal and in the peripheral portion thereof, during the transition period from the even field to the odd field and during the transition period from the odd field to the even field. In the peripheral portion of the vertical syn signal, the width of the horizontal sync signal 21 and that of the equalizing pulse 22 are half as compared with that of the normal horizontal sync signal 21.

In the prior art, since such a composite sync signal is input to the PLL circuit 100 (FIG. 8) as it is, the phase relationship in the PLL circuit 100 is disturbed due to the presence of the vertical sync signal and equalizing pulse in the composite sync signal shown in FIGS. 9A and 9C. This disturbance causes the oscillation frequency of the VCO 101 to fluctuate. If the fluctuation in the oscillation frequency of the VCO 101 is not absorbed even when entering a display period during which image information for the display area is supplied to the LCD apparatus, a problem arises in that the resulting image is distorted.

In order to avoid the image distortion from occurring, it is necessary to absorb the fluctuation in the oscillation frequency of the VCO 101 during a period prior to the above display period (i.e., a vertical retrace line interval). This is a major hindrance in the simplification of the design of a PLL circuit for a matrix type display apparatus such as an LCD apparatus.

Further, in some prerecorded video tapes which are commercially available, an AGC (Auto Gain Control) signal for the luminance signal is purposely inserted in the composite video signal in order to destabilize the playback of video tapes produced by copying the prerecorded video tapes. In the playback of these video tapes, the AGC signal cannot be completely removed by a low-pass filter in the extraction of the composite sync signal from the composite video signal, and therefore, a pulse (which may be a spurious sync signal such as that shown in FIG. 10) is mixed in immediately after the vertical sync signal in the extracted composite sync signal. When a composite sync signal in which the spurious sync signal exists immediately before the display period as shown in FIG. 10 is input to the PLL circuit 100, it is practically impossible to stabilize the PLL circuit 100 which is disturbed by the spurious sync signal, before the display period. In order to solve this problem in the prior art, such measures as narrowing the area in which the image is actually displayed on the display screen are employed, but it is difficult to completely hide the image distortion appearing in the upper portion of the display screen, and satisfactory display can not be obtained in many cases.

In order to solve the problem, an improved horizontal sync signal separation circuit has been proposed (Japanese patent application No. 2-156522, U.S. patent application Ser. No. 07/712,873, European patent application No. 91305351.8). This circuit can separate a horizontal sync signal from a composite sync signal. This horizontal sync signal separation circuit can obtain an extremely stable sampling clock by supplying a horizontal sync signal separated by the horizontal sync signal separation circuit, instead of the composite sync signal, to a PLL circuit. Therefore, it greatly improves the display quality in a matrix type display apparatus such as an LCD apparatus. However, in cases in which the quality of the composite sync signal has dropped due to a degraded radio wave condition in the reception of the broadcast wave, this horizontal sync signal separation circuit has a slight imperfection in which the image quality quickly deteriorates as a result of discontinuous degradation of the quality of the separated horizontal sync signal.

SUMMARY OF THE INVENTION

The synchronizing signal selection circuit of this invention, which overcomes the above-discussed and numerous other disadvantages and deficiencies of the prior art, includes control signal generation means for, in response to the input of a vertical synchronizing signal extracted from a composite synchronizing signal, generating a control signal which is in a predetermined state during a certain period, the period beginning when a first predetermined time period has elapsed after input of the vertical synchronizing signal and terminating when a second predetermined time period has elapsed after input of the vertical synchronizing signal; and selection means for receiving the composite synchronizing signal, a horizontal synchronizing signal separated from the composite synchronizing signal, and the control signal, and for outputting the composite synchronizing signal when control signal is in the predetermined state, and outputting the separated horizontal synchronizing signal when the control signal is in a state other than the predetermined state.

In a preferred embodiment, the first predetermined time period is shorter than the second predetermined time period.

In a preferred embodiment, the control signal generation means includes counting means for receiving a periodic pulse string, and for counting the number of pulses contained in the periodic pulse string; and decoding means coupled to the output of the counting means, for, setting the control signal to the predetermined state when the output of the counting means becomes a first predetermined value, the first predetermined value corresponding to the first predetermined time period, and for setting the control to a state other than the predetermined state when the output of the counting means becomes a second predetermined value, the second predetermined value corresponding to the second predetermined time period.

In a preferred embodiment, the counting means is reset by the rising edge of the vertical synchronizing signal.

In a preferred embodiment, the control signal generation means includes first pulse signal generation means for, in response to the input of the vertical synchronizing signal, generating a first pulse signal, the first pulse signal ending when the first predetermined time period has elapsed after the input of the vertical synchronizing signal; second pulse signal generation means for, in response to input of the vertical synchronizing signal, generating a second pulse signal, the second pulse signal ending when the second predetermined time period has elapsed after the input of the vertical synchronizing signal; and means for generating the control signal, based on the first and second pulse signals.

Alternatively, the control signal generation means may include first pulse signal generation means for, in response to the input of the vertical synchronizing signal, generating a first pulse signal, the first pulse signal ending when the first predetermined time period has elapsed after input of the vertical synchronizing signal; second pulse signal generation means for, in response to the end of the first pulse signal, generating a second pulse signal, the second pulse signal ending when the second predetermined time period has elapsed after the end of the first pulse signal; and means for generating the control signal, based on the first and second pulse signals.

Thus, the invention described herein makes possible the objectives of:

(1) providing a synchronizing signal selection circuit which can correctly extract the timing of a horizontal synchronizing signal from a composite synchronizing signal;

(2) providing a synchronizing signal selection circuit which can surely obtain a horizontal synchronizing signal from a composite synchronizing signal even when a noise mixedly exists in the composite synchronizing signal; and (3) providing a synchronizing signal selection circuit which can improve the image quality of a display apparatus such as an LCD apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This invention may be better understood and its numerous objects and advantages will become apparent to those skilled in the art by reference to the accompanying drawings which are given by way of illustration only, and thus are not limitative of the present invention, and wherein.

DESCRIPTION OF THE PREFERRED EMBODIMENTS

Figure 1:
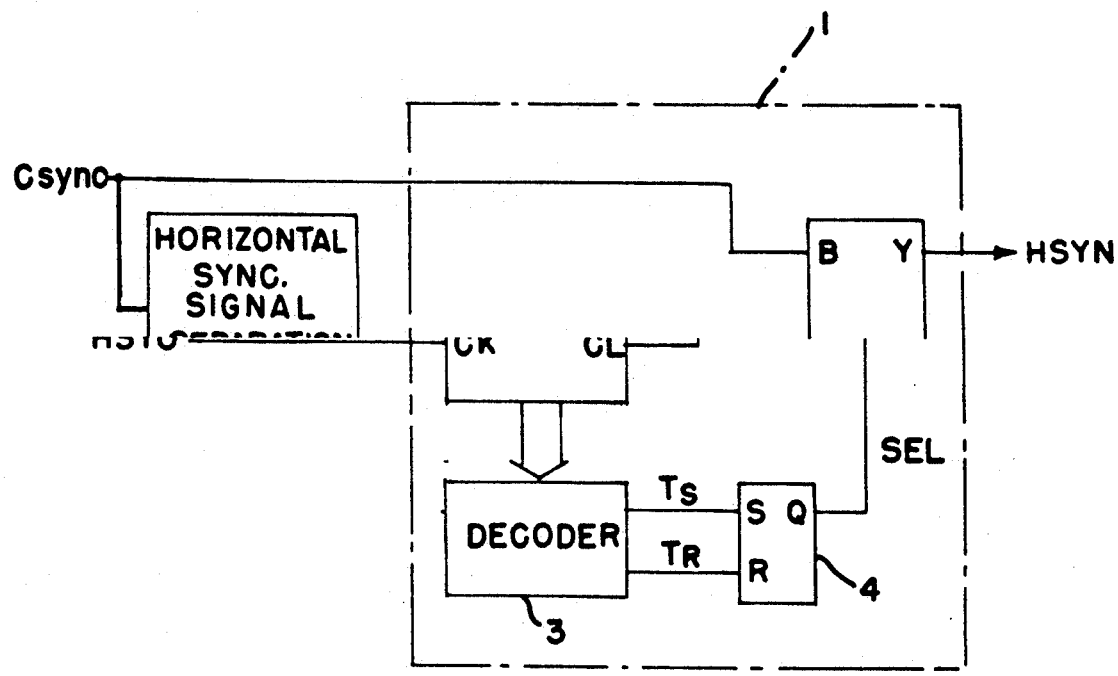
FIG. 1 is a block diagram showing a sync signal selection circuit in a first embodiment of the invention.

FIG. 1 is a block diagram of a first embodiment of the invention. A sync signal selection circuit 1 in FIG. 1 comprises a counter 2, a decoder 3, an RS flip-flop 4 and a selector 5.

The counter 2, the decoder 3 and the RS flip-flop 4 function together as a signal generation circuit for generating a selection signal SEL. A vertical sync signal $V_{syn}$ separated from a composite sync signal $C_{sync}$ is input to the clear terminal CL of the counter 2. The counter 2 is cleared by the rising edge of the vertical sync signal $V_{syn}$. A circuit for separating the vertical sync signal $V_{syn}$ from the composite sync signal $C_{sync}$ is known from the Television Institute's publication, "Television" (Corona Publishing Co., Ltd, Japan.). A signal HSYO which is a periodic pulse string is input to the clock terminal CK of the counter 2. The counter 2 starts to count the pulses in the signal HSYO, immediately after being cleared, and the count result is supplied to the decoder 3. The decoder 3 outputs a set signal $T_S$ when the count result indicates a first predetermined value after a first predetermined time period has elapsed from when the counter 2 was cleared. The decoder 3 also outputs a reset signal $T_R$ when the count result indicates a second predetermined value after a second predetermined time period has elapsed from when the counter 2 was cleared. The set signal $T_S$ and the reset signal $T_R$ are supplied to the set terminal S and the reset terminal R, respectively, of the RS flip-flop 4. Therefore, a selection signal SEL output from the RS flip-flop 4 is set by the set signal $T_S$ to be HIGH, and is reset by the reset signal $T_R$ to be LOW.

The composite sync signal $C_{sync}$ and a horizontal sync signal $H_{syn}$ obtained from the composite sync signal $C_{sync}$ by a horizontal sync signal separation circuit 10 are input to a terminal B and a terminal A, respectively, of the selector 5. The selection signal SEL is input to a terminal S of the selector 5. The selector 5 selectively outputs as a horizontal sync signal HSYN the composite sync signal $C_{sync}$ when the selection signal SEL is HIGH, and selectively outputs the separated horizontal sync signal $H_{syn}$ when the selection signal SEL is LOW. The signal HSYN output from the selector 5 becomes the horizontal sync signal that is finally used. By using this horizontal sync signal HSYN as the input for a PLL circuit like that shown in FIG. 8, a sampling clock signal is obtained for a matrix type display apparatus such as an LCD apparatus.

Figure 2:
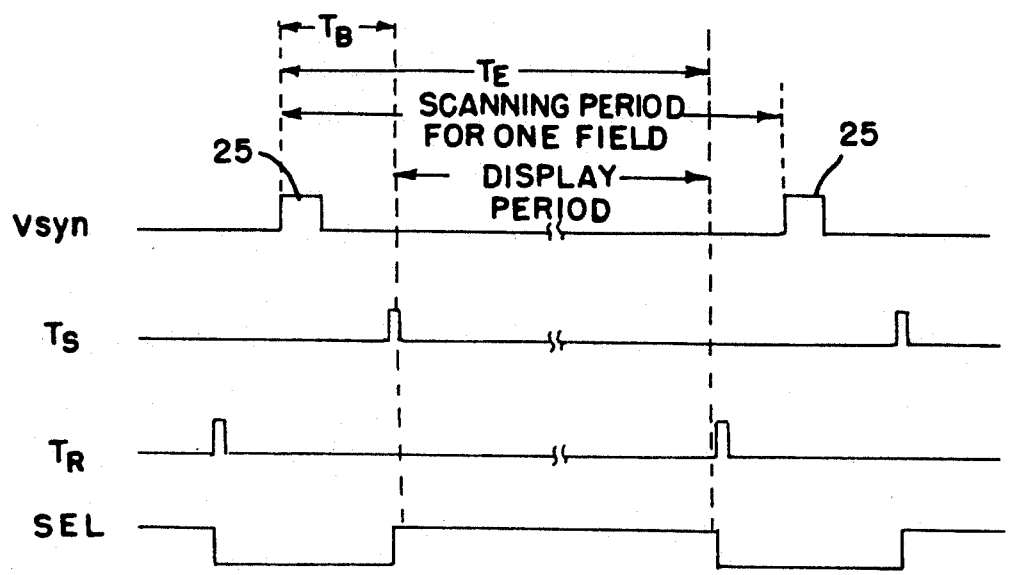
FIG. 2 is a timing chart illustrating the operation of the first embodiment.

Next, the operation of the embodiment is described with reference to FIG. 2. The period from one vertical sync signal 25 to the next vertical sync signal 25 is the scanning period for one field, but the display period during which display is actually performed is a part of the scanning period as shown in FIG. 2. The display period begins after a period of time $T_B$ has elapsed from the rising edge of the vertical sync signal 25, and it is completed after a period of time $T_E$ has elapsed. The first predetermined time period is set slightly shorter than the period of time $T_B$, and the second predetermined time period is set slightly longer than the period of time $T_E$. Therefore, the decoder 3 outputs the set signal $T_S$ immediately before the start of the display period and outputs the reset signal $T_R$ immediately after the completion of the display period. As a result, the selection signal SEL becomes HIGH during the display period, and becomes LOW during all other periods, i.e., during the vertical retrace line interval. Therefore, the composite sync signal $C_{sync}$ is output from the selector 5 as the horizontal sync signal HSYN during the display period, and the separated horizontal sync signal $H_{syn}$ is output from the selector 5 as the horizontal sync signal HSYN during the vertical retrace line interval.

Figure 3:
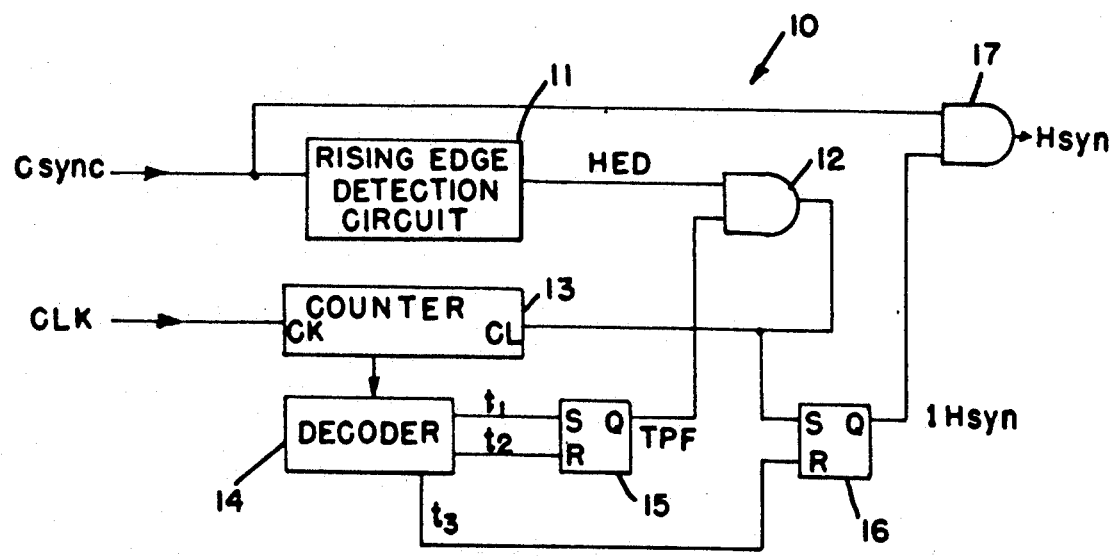
FIG. 3 is a block diagram showing an example of a horizontal sync signal separation circuit used in conjunction with the sync signal selection circuit of the invention.

In order to describe the advantage attained by this embodiment, first we will explain an example of the horizontal sync signal separation circuit 10 by referring to FIG. 3. The composite sync signal $C_{sync}$ is input to a rising edge detection circuit 11. When the rising edge detection circuit 11 detects the rise of the composite sync signal $C_{sync}$, it supplies a pulse signal HED to one input terminal of an AND gate 12. A counter 13 counts the number of pulses in the clock signal CLK. The output of the counter 13 is supplied to a decoder 14. The decoder 14 decodes the output of the counter 13 to output three timing signals $t_1$, $t_2$ and $t_3$. The timing signals $t_1$ and $t_2$ are input to the set terminal S and the reset terminal R of an RS flip-flop 15, respectively. An output signal TPF of the RS flip-flop 15 is supplied to the other input terminal of the AND gate 12, and the pulse signal HED passes through the AND gate 12 while the signal TPF is HIGH. That is, the signal TPF is a control signal for the AND gate 12, and this control signal TPF is generated by the decoder 14 and the RS flip-flop 15 based on the output of the counter 13. The output of the AND gate 12 (i.e., the signal HED that passes through the AND gate 12) is input to the clear terminal CL of the counter 13. The timing signal $t_3$ is supplied to the reset terminal R of an RS flip-flop 16. The output of the AND gate 12 is supplied to the set terminal S of the RS flip-flop 16. The composite sync signal $C_{sync}$ and a signal $IH_{syn}$ output from the RS flip-flop 16 are input to the two input terminals of an AND gate 17, respectively. The separated horizontal sync signal $H_{syn}$ is output from the AND gate 17. The rise of the pulse in the separated horizontal sync signal $H_{syn}$ essentially corresponds with the passage of the pulse signal HED through the AND gate 12 by the action of the RS flip-flop 16 and the AND gate 17. The operation of the horizontal sync signal separation circuit 10 in FIG. 3 and other configurations of the horizontal sync signal separation circuit 10 are described in the above-mentioned patent applications.

Figure 4:
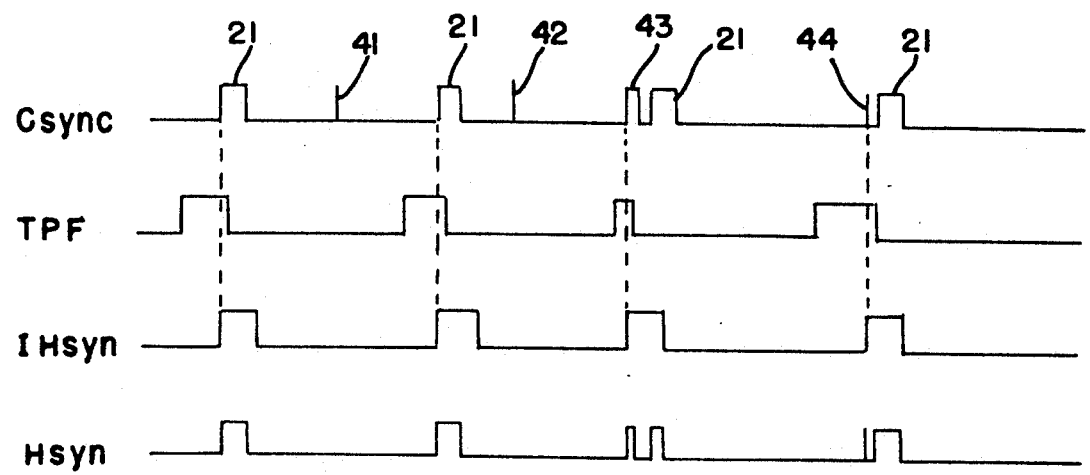
FIG. 4 is a timing chart illustrating the operation of the horizontal sync signal separation circuit of FIG. 3 in a case wherein a pulse caused by noise is mixed into a composite sync signal.

When the quality of a received composite video signal deteriorates to a certain degree due to degradation of the radio wave condition, a pulse caused by noise is mixed in the composite sync signal $C_{sync}$ extracted from the composite video signal. FIG. 4 shows the composite sync signal $C_{sync}$ containing noise, and the control signal TPF, the signal $IH_{syn}$ and the separated horizontal sync signal $H_{syn}$ which are generated in the horizontal sync signal separation circuit 10 (FIG. 3) when the composite sync signal $C_{sync}$ containing noise is input. In FIG. 4, the composite sync signal $C_{sync}$ also contains pulses 41, 42, 43 and 44 caused by noise, in addition to the horizontal sync signal 21. Of these pulses, the pulses 41 and 42 do not affect the separated horizontal sync signal $H_{syn}$, because they are removed by the control signal TPF. However, since the pulses 43 and 44 are generated during the period when the control signal TPF is HIGH, they do affect the separated horizontal sync signal $H_{syn}$. The pulse 43, in particular, causes the separated horizontal sync signal $H_{syn}$ to lose much of the waveform of the original horizontal sync signal 21 in the composite sync signal $C_{sync}$. In an extreme case, the original horizontal sync signal 21 may become completely nonexistent in the separated horizontal sync signal $H_{syn}$ due to pulses caused by noise. In this case, the PLL circuit to which the separated horizontal sync signal $H_{syn}$ is input is greatly affected, resulting in large shifts in the phase of the clock signal output from the PLL circuit.

In the case in which the level of the noise mixed into the composite video signal is lower than the threshold level of the separation circuit for separating the composite sync signal $C_{sync}$ from the composite video signal, a pulse such as that described above is not mixed in the composite sync signal $C_{sync}$, and a good separated horizontal sync signal $H_{syn}$ is obtained from the horizontal sync signal separation circuit 10. However, when the noise level exceeds the threshold level of the separation circuit for separating the composite sync signal $C_{sync}$ from the composite video signal, a pulse becomes mixed with the composite sync signal $C_{sync}$, thus causing the quality of the separated horizontal sync signal $H_{syn}$ to drop below that of the original composite sync signal $C_{sync}$. Since this deterioration in the quality of the separated horizontal sync signal $H_{syn}$ occurs suddenly at the point the noise level exceeds a certain level, the image quality is degraded quickly and severely when the quality of the separated horizontal sync signal $H_{syn}$ deteriorates.

According to this embodiment, the separated horizontal sync signal obtained by the horizontal sync signal separation circuit 10, i.e., the horizontal sync signal $H_{syn}$ obtained by removing the vertical sync signal and equalizing pulse contained in the composite sync signal, is output as the horizontal sync signal HSYN only during the vertical retrace line interval during which the waveform of the composite sync signal $C_{sync}$ differs greatly from that of the horizontal sync signal 21. In a display period during which the composite sync signal $C_{sync}$ contains only the horizontal sync signal 21, the composite sync signal $C_{sync}$ is output as the horizontal sync signal HSYN. Therefore, the quality of the horizontal sync signal HSYN does not fall below that of the original composite sync signal $C_{sync}$, and resistance to noise in cases of high noise levels is improved.

Figure 5:
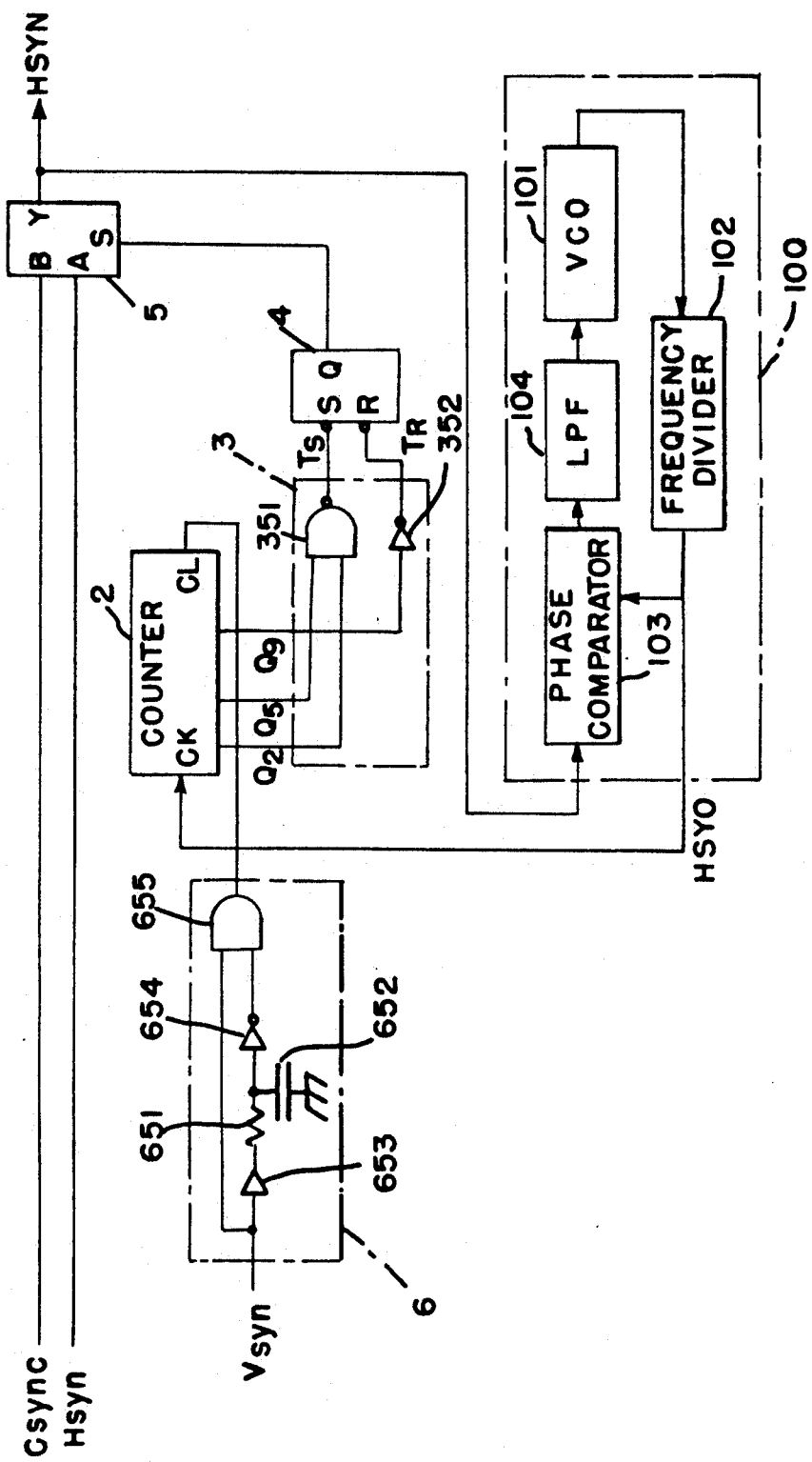
FIG. 5 is a circuit diagram illustrating a second embodiment of the invention.
Figure 8:
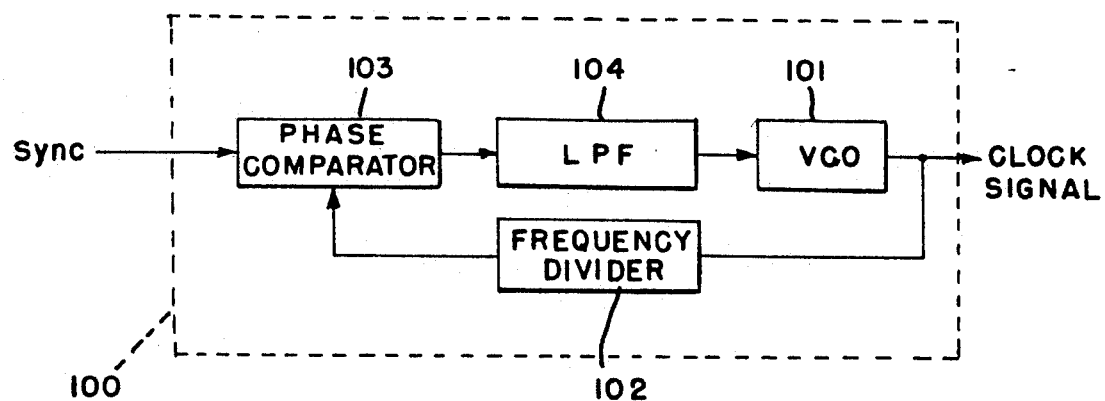
FIG. 8 is a block diagram showing a PLL circuit used for generating a sampling clock in a prior art LCD apparatus.
Figure 9A:
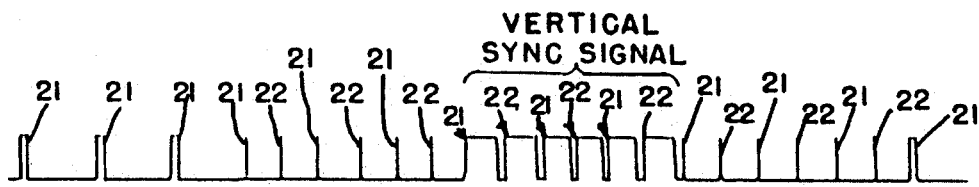
FIGS. 9A to 9C show composite sync signals used in the NTSC system.
Figure 9B:
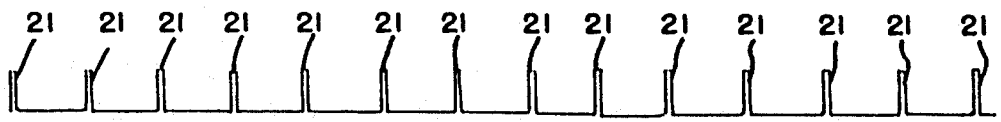
Figure 9C:
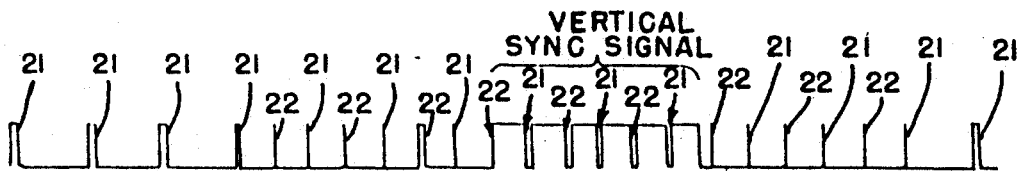

FIG. 5 shows a second embodiment of the invention. In FIG. 5, components similar to those of the sync signal selection circuit 1 in FIG. 1 are designated by the same reference numerals as those in FIG. 1. In this embodiment, the vertical sync signal $V_{syn}$ is input to the clear terminal CL of the counter 2 via a rising edge detection circuit 6. The rising edge detection circuit 6 comprises a resistor 651, a capacitor 652, a buffer 653, an inverter 654 and an AND gate 655. The counter 2 is a binary counter. The second, fifth and ninth outputs $Q_2$, $Q_5$ and $Q_9$ of the counter 2 are supplied to the decoder 3. The output of a frequency divider 102 of a PLL circuit 100 similar to that in FIG. 8 is used as the signal HSYO input to the clock terminal CK of the counter 2. The horizontal sync signal HSYN from the selector 5 is input to a phase comparator 103 of the PLL circuit 100. Since the separated horizontal sync signal $H_{syn}$ may contain pulses caused by noise as described above, it is not preferable to use the separated horizontal sync signal $H_{syn}$ as the signal HSYO. The decoder 3 comprises a NAND gate 351 which outputs the set signal $T_S$, and an inverter 352 which outputs the reset signal $T_R$. The outputs $Q_2$ and $Q_5$ of the counter 2 are input to the NAND gate 351. Therefore, the set signal $T_S$ is output when the value of the output of the counter 2 becomes 18 (decimal). The selection signal SEL becomes HIGH in response to the set signal $T_S$. The output $Q_9$ of the counter 2 is supplied to the inverter 352. Therefore, the reset signal $T_R$ is output when the value of the output of the counter 2 becomes 256 (decimal). The selection signal SEL becomes LOW in response to the reset signal $T_R$.

Figure 6:
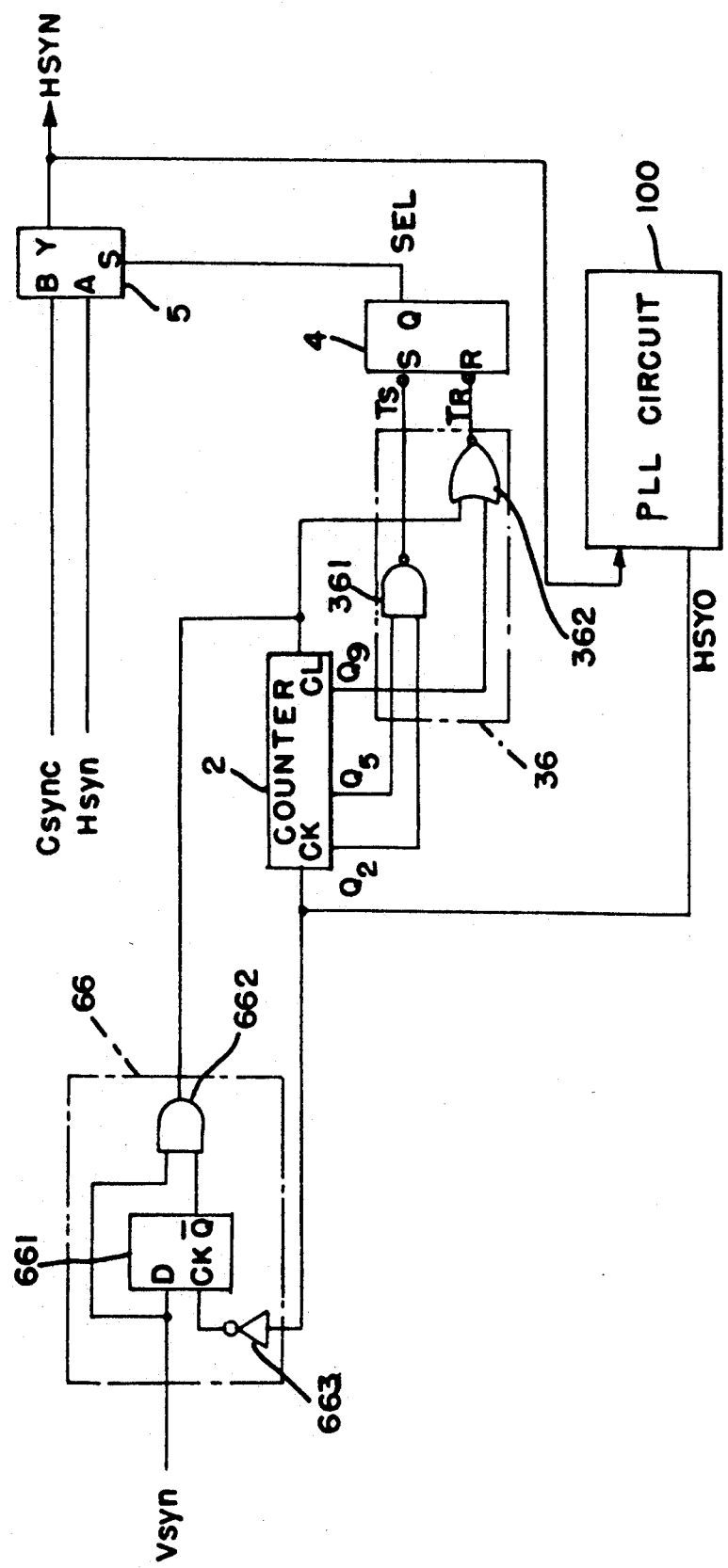
FIG. 6 is a circuit diagram illustrating a third embodiment of the invention.

FIG. 6 shows a third embodiment of the invention. In FIG. 6, components similar to those of the sync signal selection circuit 1 in FIG. 1 are designated by the same reference numerals as those in FIG. 1. In this embodiment, a rising edge detection circuit 66 comprising a D-type flip-flop 661, an AND gate 662 and an inverter 663 is used in place of the rising edge detection circuit 6 in FIG. 5. The signal HSYO obtained by the PLL circuit 100 in the same way as in FIG. 5 is supplied to the clock terminal CK of the D-type flip-flop 661 via the inverter 663. In this embodiment, a decoder 36 comprising a NAND gate 361 and a NOR gate 362 is used in place of the decoder 3 in FIG. 5. The NAND gate 361 functions in the same manner as the NAND gate 351 in FIG. 5. The output $Q_9$ of the counter 2 and the output of the rising edge detection circuit 66 are input to the NOR gate 362 for outputting the reset signal $T_R$. By this arrangement, it is ensured that the reset signal $T_R$ is output and that the selection signal SEL is returned to LOW, even if the next rising edge of the vertical sync signal $V_{syn}$ is detected before the value of the output of the counter 2 reaches 256. In the case in which a regular NTSC signal is not supplied to a television apparatus as the composite video signal such as in high speed search of video tapes, the next rising edge of the vertical sync signal $V_{syn}$ may be detected before the value of the output of the counter 2 reaches 256. This embodiment normally functions even in such a case.

Figure 7:
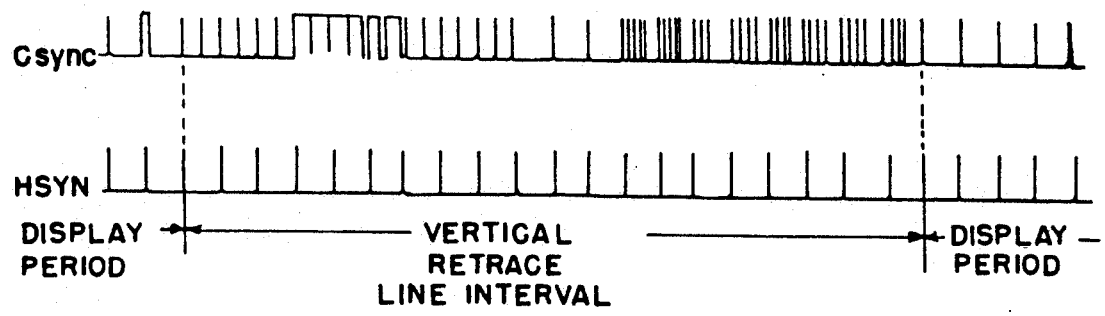
FIG. 7 shows an example of a horizontal sync signal obtained from a composite sync signal by the sync signal selection circuit of the invention and the horizontal sync signal separation circuit shown in FIG. 3.
Figure 10:
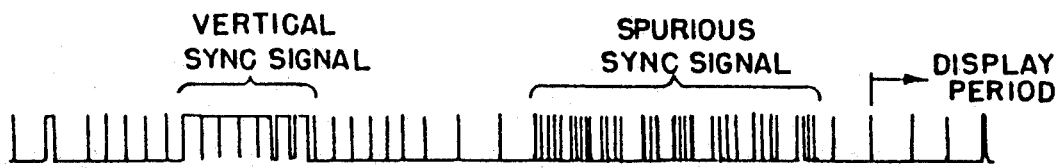
FIG. 10 shows a composite sync signal obtained from a video tape which was subjected to a duplication prevention process.

FIG. 7 shows the composite sync signal $C_{sync}$ into which a spurious sync signal similar to that in FIG. 10 is mixed, and the horizontal sync signal HSYN obtained from the composite sync signal $C_{sync}$ by the combination of the horizontal sync signal separation circuit shown in FIG. 3 and the sync signal selection circuit shown in FIG. 5. As shown in FIG. 7, the separated horizontal sync signal $H_{syn}$ output from the horizontal sync signal separation circuit is output as the horizontal sync signal HSYN during the vertical retrace line interval. During the display period, the composite sync signal $C_{sync}$ is output as it is as the horizontal sync signal HSYN. According to the nature of the composite sync signal, the vertical sync signal and equalizing pulse exist in the composite sync signal and a spurious sync signal is mixed with the composite sync signal only during the vertical retrace line interval. Therefore, the use of the composite sync signal $C_{sync}$ as it is during the display period according to the invention conforms with the nature of the composite sync signal.

Figure 11:
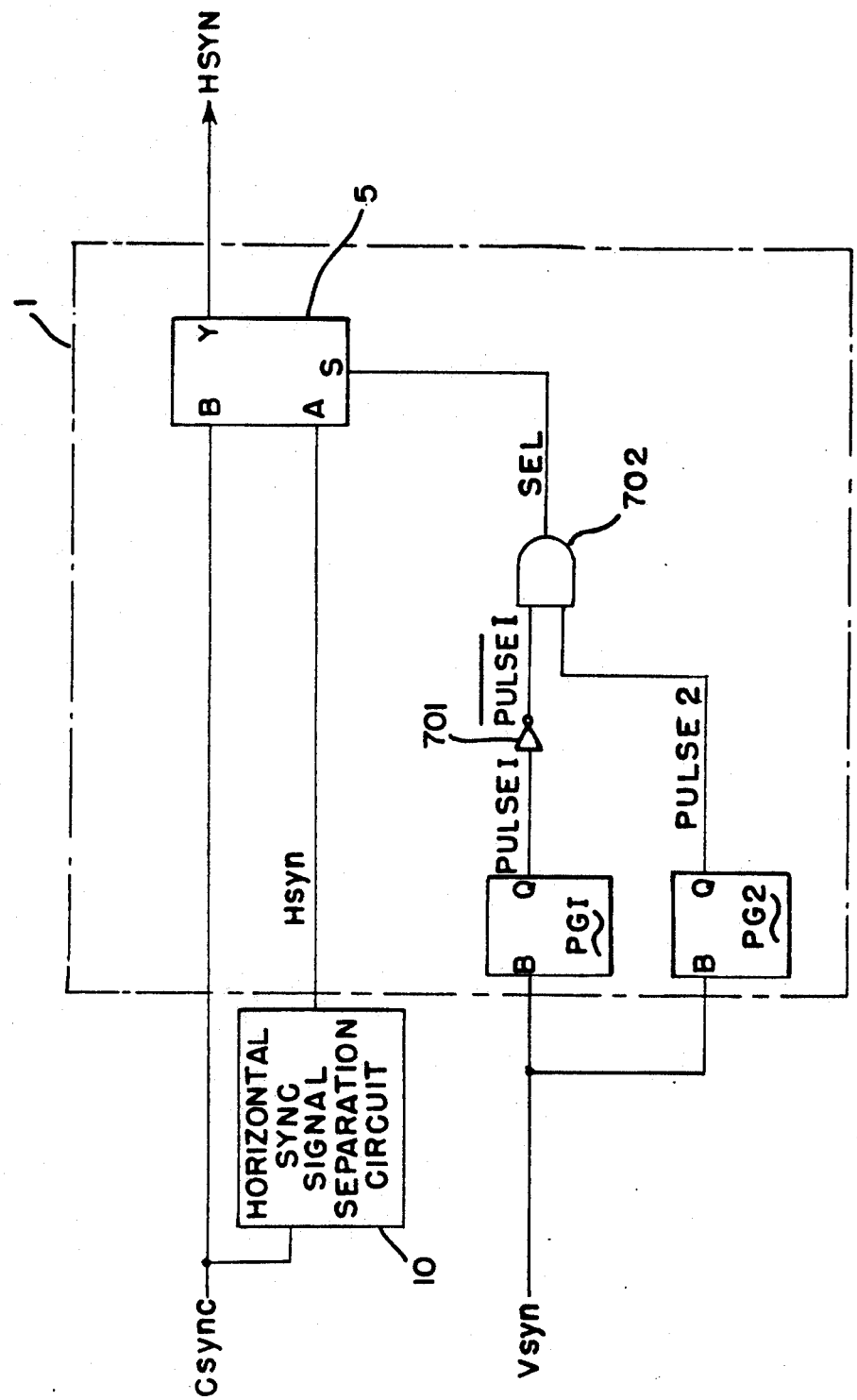
FIG. 11 is a block diagram showing a fourth embodiment of the invention.

FIG. 11 shows a fourth embodiment of the invention. The sync signal selection circuit 1 of this embodiment comprises a first pulse generation circuit PG1 and a second pulse generation circuit PG2. The pulse generation circuits PG1 and PG2 generate pulses from the outputs Q in synchronous with the potential rise at their inputs B. The vertical sync signal $V_{syn}$ separated from the composite sync signal $C_{sync}$ is input to the inputs B of the pulse generation circuits PG1 and PG2. The output Pulse1 of the first pulse generation circuit PG1 is coupled to one input terminal of an AND gate 702 via an inverter 701. The output Pulse2 of the second pulse generation circuit PG2 is directly connected to the other input terminal of the AND gate 702. The output of the AND gate 702 is input to the terminal S of the selector 5 as the selection signal SEL.

Figure 12:
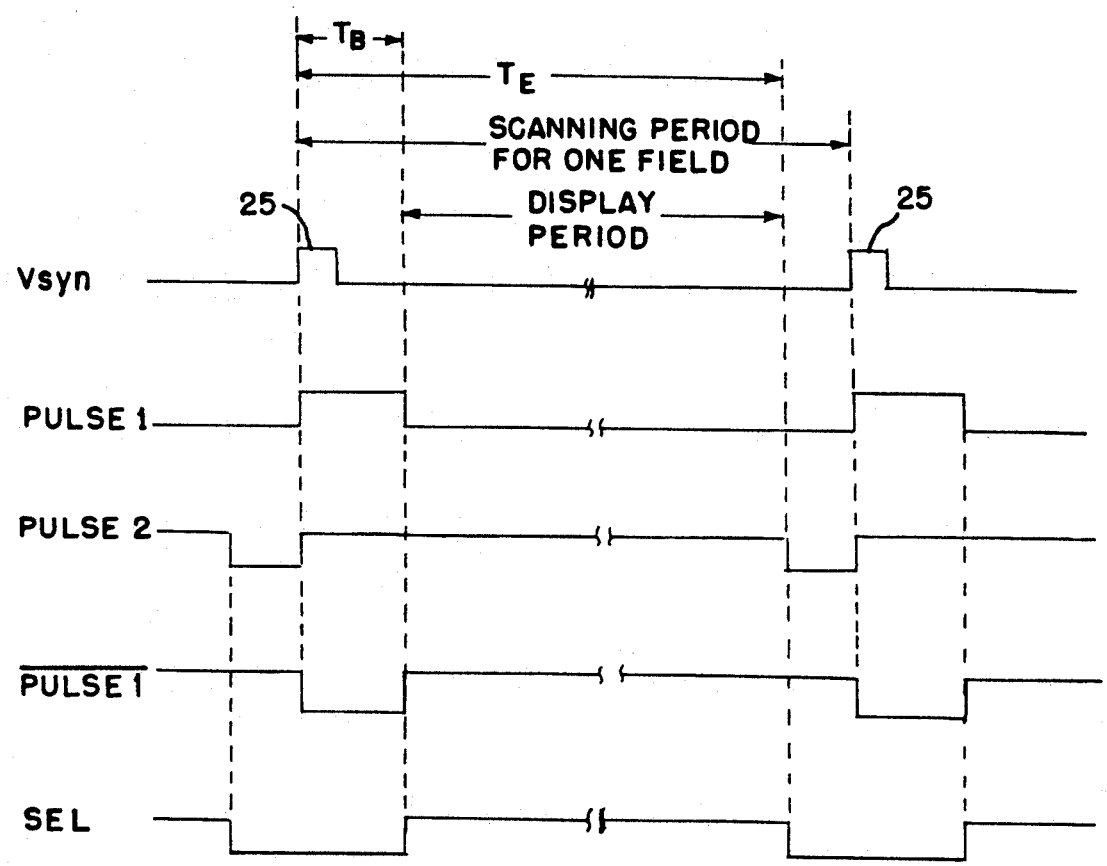
FIG. 12 is a timing chart illustrating the operation of the fourth embodiment.

The operation of this embodiment is described by referring to FIG. 12. As described above, the period from one vertical sync signal 25 to the next vertical sync signal 25 is the scanning period for one field, but the display period during which display is actually performed is a part of the scanning period as shown in FIG. 12. The display period starts after the period of time $T_B$ has elapsed from the rising edge of the vertical sync signal 25, and ends after the period of time $T_E$ has elapsed.

In this embodiment, the pulse Pulse1 is generated by the first pulse generation circuit PG1 so that its pulse width is approximately equal to the period of time $T_B$. The pulse Pulse2 is generated by the second pulse generation circuit PG2 so that its pulse width is approximately equal to the period of time $T_E$. As shown in FIG. 12, therefore, the selection signal SEL output from the AND gate 702 is HIGH only during the display period in the scanning period of one field. For this reason, the composite sync signal $C_{sync}$ is selected and output as the output of the selector 5 during the display period, and the horizontal sync signal $H_{syn}$ separated by the horizontal sync signal separation circuit 10 is selected and output during the period other than the display period.

Figure 13:
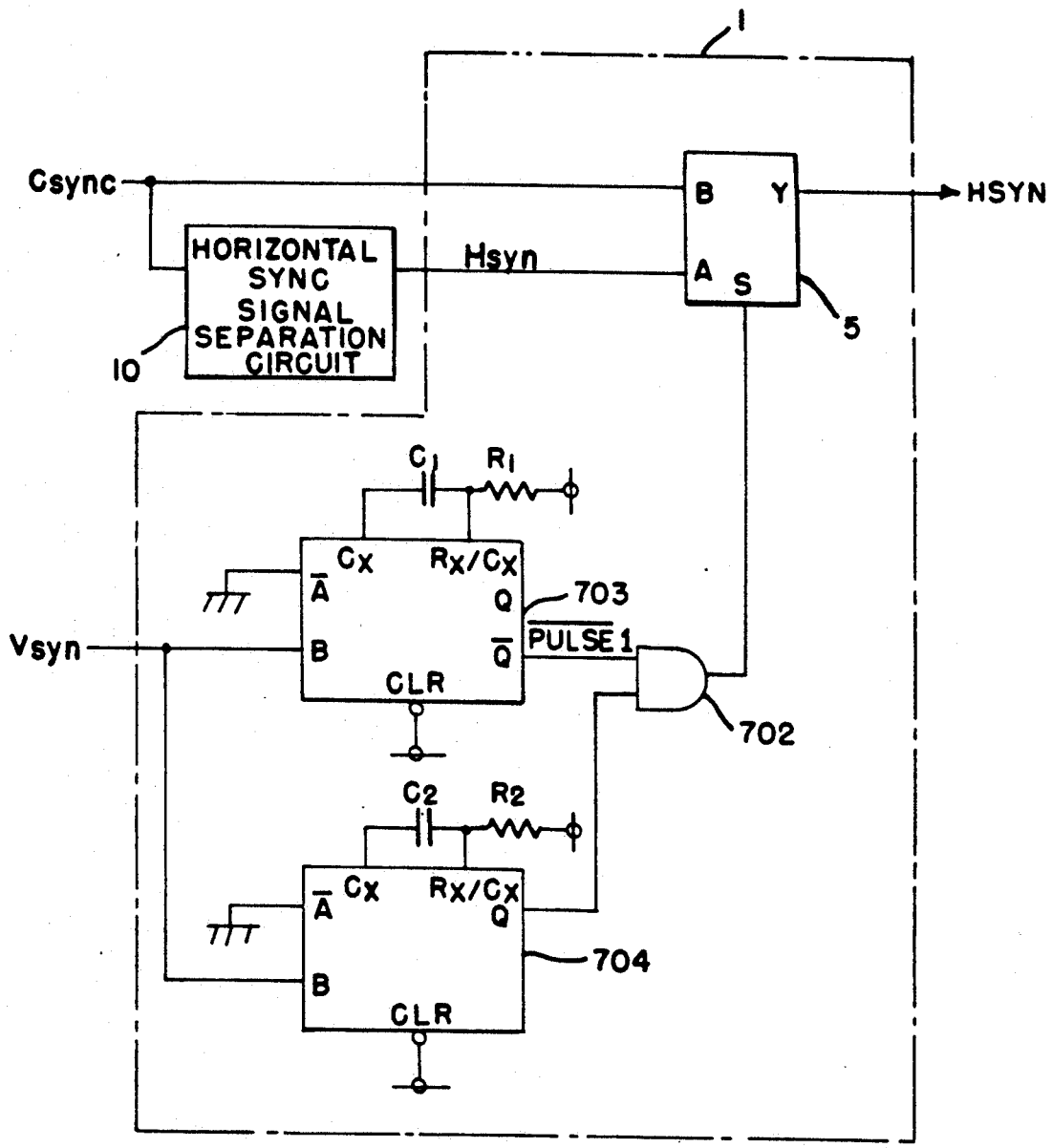
FIG. 13 is a block diagram showing an example of the variation of the fourth embodiment.

FIG. 13 shows the circuit diagram of a configuration in which the first pulse generation circuit PG1 and the second pulse generation circuit PG2 in the embodiment of FIG. 11 are realized by two monostable multivibrators 703 and 704. In this case, the inverter 701 in FIG. 11 is not used, and the pulse $\overline{Pulse1}$ is obtained directly from the output of the inverted logic output $\overline{Q}$ of the monostable multivibrator 703. In this example, the width of each of the pulses is determined by appropriately setting the time constants determined by capacitors $C_1$ and $C_2$ and resistors $R_1$ and $R_2$. Generally, error is large in the control of the pulse widths determined by the time constant of C and R. Since it is not necessary to strictly control the widths of the pulses Pulse1 and Pulse2 as described below, there is no problem in practical application even if the pulse widths are predetermined by the time constant of C and R.

Figure 14:
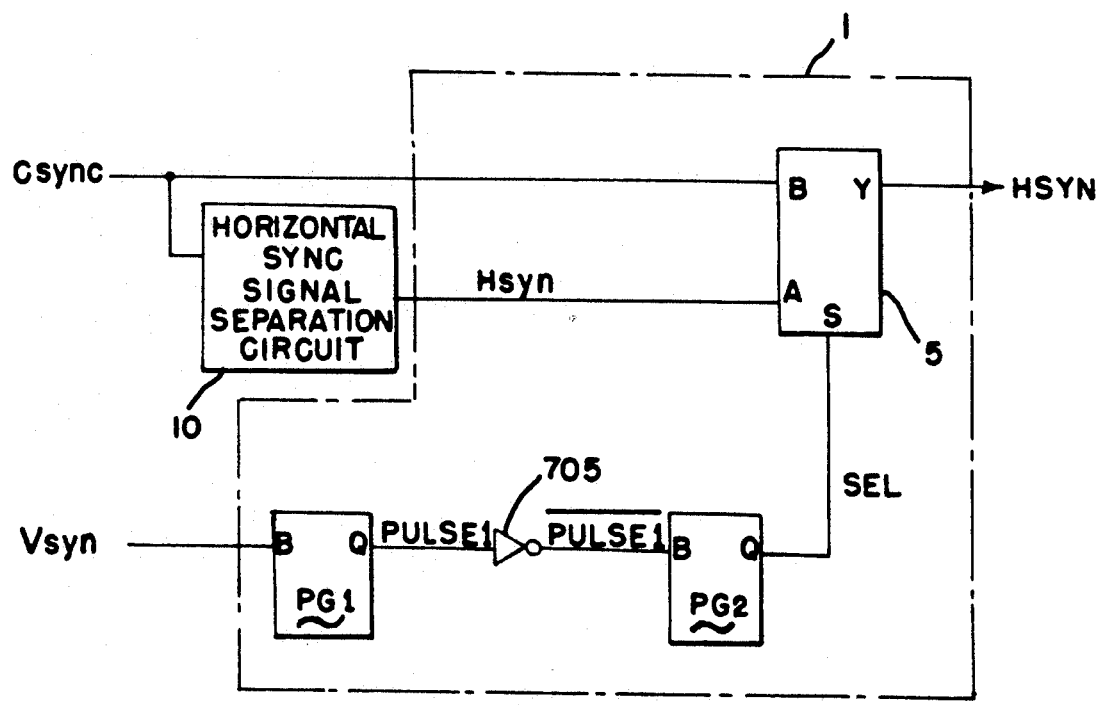
FIG. 14 is a block diagram showing a fifth embodiment of the invention.

FIG. 14 shows a fifth embodiment of the invention. In this embodiment, the output of the first pulse generation circuit PG1 is input to the second pulse generation circuit PG2 via an inverter 705, and the output of the second pulse generation circuit PG2 is input to the terminal S of the selector 5.

Figure 15:
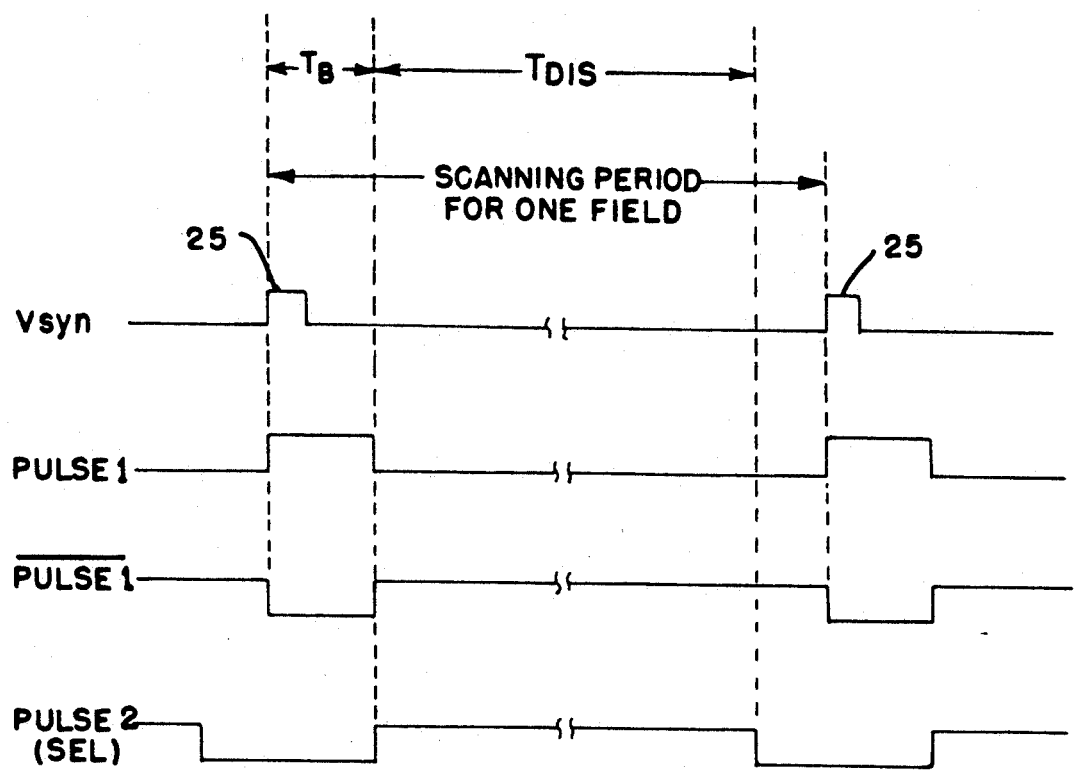
FIG. 15 is a timing chart illustrating the operation of the fifth embodiment.

The operation of this embodiment is described by referring to FIG. 15. In FIG. 15, $T_B$ is the time period from the rise of the vertical sync signal $V_{syn}$ to the beginning of the display period, and $T_{DIS}$ is the display period. The first pulse generation circuit PG1 generates the pulse Pulse1 of width $T_B$ from the rise of the vertical sync signal $V_{syn}$, and the second pulse generation circuit PG2 generates the pulse Pulse2 of width $T_{DIS}$ from the rising edge of the inverted signal $\overline{Pulse1}$ of the pulse Pulse1 (i.e., the falling edge of the pulse Pulse1). This Pulse2 is supplied as it is as the selection signal SEL to the terminal S of the selector 5. Therefore, the composite signal $C_{sync}$ is selected and output as the output of the selector 5 during the display period, and the horizontal sync signal $H_{syn}$ separated by the horizontal sync signal separation circuit 10 is selected and output during the period other than the display period.

Theoretically, it is preferable that the HIGH-level period of the selection signal SEL shown in FIGS. 12 and 15 coincides with the display period. That is, it is desirable that the rising and falling positions of the selection signal SEL agree with the start position and the end position of the display period, respectively. However, there is no problem in the practical application, if the HIGH-level period of the selection signal SEL occupies the major portion of the display period. Therefore, it is not necessary to strictly control the widths of the pulses Pulse1 and Pulse2.

Figure 16:
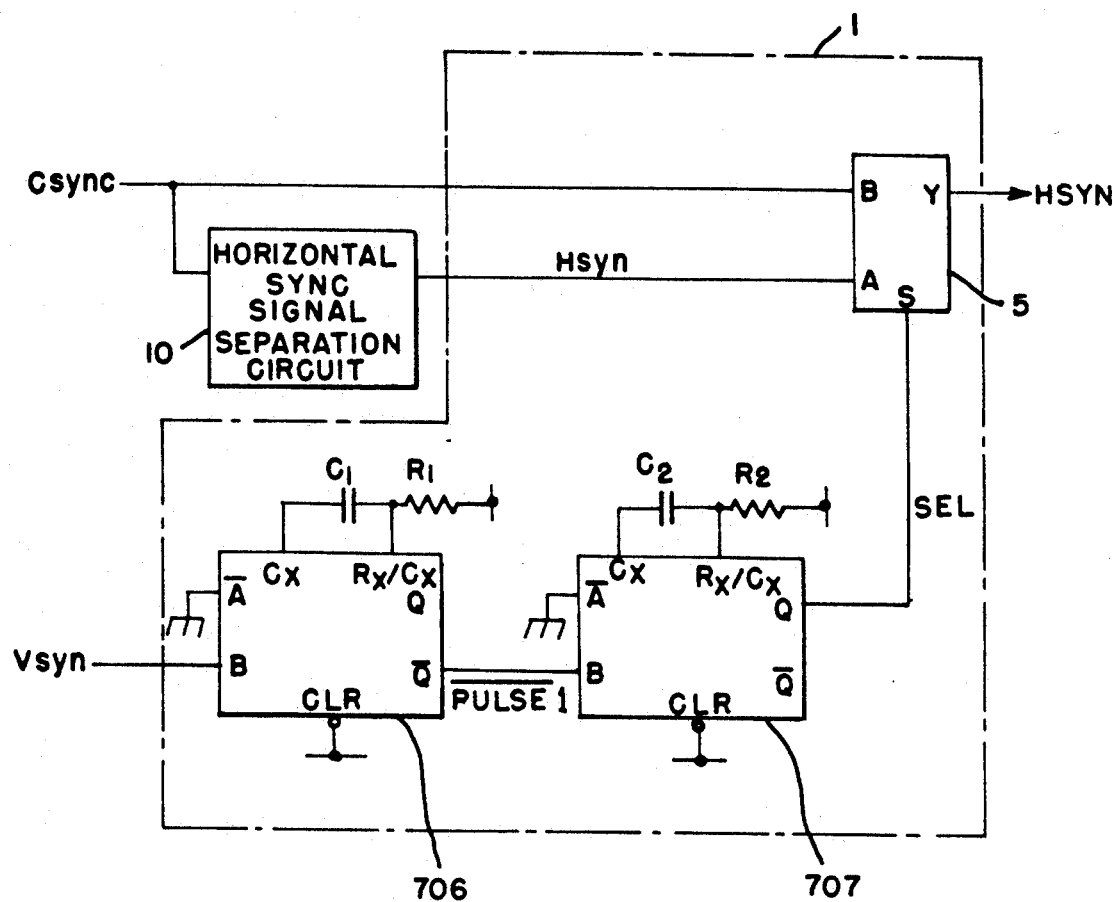
FIGS. 16 and 17 are block diagrams showing examples of variations of the fifth embodiment.

FIG. 16 shows the circuit diagram of a configuration in which the first and second pulse generation circuits PG1 and PG2 in the embodiment of FIG. 14 are realized by monostable multivibrators 706 and 707. In this case, the inverter 705 in FIG. 14 is not used, and the pulse $\overline{Pulse1}$ is obtained directly from the output of the inverted logic output $\overline{Q}$ of the monostable multivibrator 706.

Figure 17:
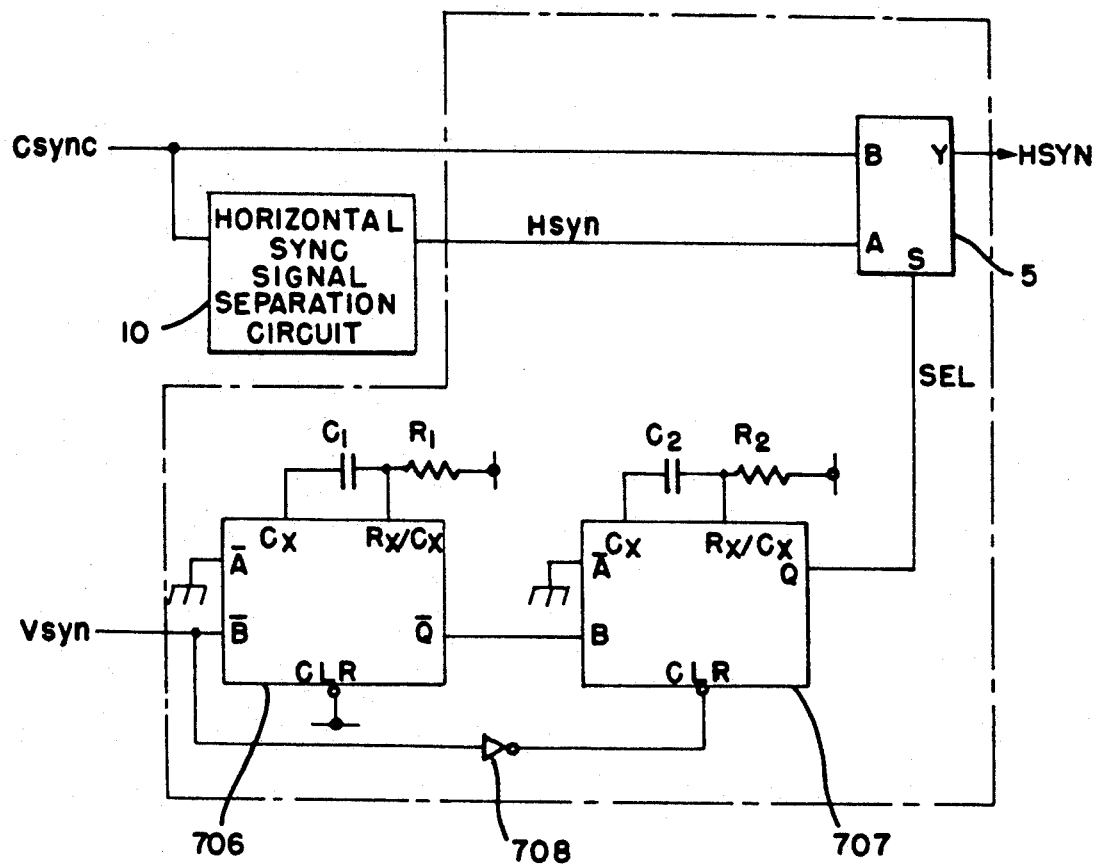

FIG. 17 shows a variation of the example in FIG. 16. In the example shown in FIG. 17, the vertical sync signal $V_{syn}$ is input to the CLR input of the monostable multivibrator 707 via an inverter 708. Even if the next rise of the vertical sync signal $V_{syn}$ occurs while the output of the monostable multivibrator 707 (i.e., the selection signal SEL) is HIGH, the multivibrator 707 is reset at this time. Therefore, the horizontal sync signal $H_{syn}$ is output from the selector 5 as the horizontal sync signal HSYN from that time until the next rise of the selection signal SEL. For this reason, the vertical sync signal contained in the composite sync signal $C_{sync}$, or the spurious sync signal shown in FIG. 10 can be prevented from being output as the horizontal sync signal HSYN. This may occur when a signal different from a regular NTSC signal is input as the composite video signal as in special effect playback (high speed search, pause, etc.) of video tapes, but this embodiment functions normally even under these conditions.

According to the invention, a sync signal selection circuit is provided that is capable of obtaining a good horizontal sync signal from the composite sync signal, even in cases in which pulses and other signals caused by noise are mixed in the composite sync signal, by selectively using the composite sync signal and the horizontal sync signal separated from the composite sync signal. By using sync signal selection circuit of the invention, the high resistance to noise can be achieved in a display apparatus such as an LCD apparatus in which it is necessary to obtain a sampling clock signal from the composite sync signal.

In the conventional apparatuses, it was necessary to speed up the response characteristics of a PLL circuit in order to absorb the disturbance due to the vertical sync signal, the equalizing pulse or the spurious equalizing pulse described above in the composite sync signal $C_{sync}$, but this has the side effect of causing a so-called watery effect (video image vibrates left and right) in a weak electric field. In the conventional systems, it was not possible to solve both these problems. By combining the above-mentioned horizontal sync signal separation circuit and the invention, both these problems can be solved, and ideal designs can be independently performed even with respect to the watery effect.

The invention can not only solve problems in video playback, but it also can contribute greatly to improved overall performance and display quality in an LCD apparatus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A synchronizing signal selection circuit comprising:

control signal generation means for generating a control signal which is in a predetermined state during a certain period, in response to input of a vertical synchronizing signal extracted from a composite synchronizing signal, said certain period beginning when a first predetermined time period has elapsed after input of said vertical synchronizing signal and terminating when a second predetermined time period has elapsed after input of said vertical synchronizing signal, said composite synchronizing signal being substantially different from a horizontal synchronizing signal separated from said composite synchronizing signal during a period other than said certain period; and selection means, receiving said composite synchronizing signal, said separated horizontal synchronizing signal, and said control signal, for outputting said composite synchronizing signal when said control signal is in said predetermined state and for outputting said separated horizontal synchronizing signal when said control signal is in a state other than said predetermined state.

2. The synchronizing signal selection circuit according to claim 1, wherein said first predetermined time period is shorter than said second predetermined time period.

3. The synchronizing signal selection circuit according to claim 1, wherein said control signal generation means comprises:

counting means for receiving a periodic pulse string and for counting a number of pulses contained in said periodic pulse string; and decoding means, coupled to an output of said counting means, for setting said control signal to said predetermined state when the output of said counting means becomes a first predetermined value, said first predetermined value corresponding to said first predetermined time period, setting said control signal to the state other than said predetermined state when the output of said counting means becomes a second predetermined value, said second predetermined value corresponding to said second predetermined time period, and outputting said control signal to said selection means.

4. The synchronizing signal selection circuit according to claim 3, wherein said counting means is reset by a rising edge of said vertical synchronizing signal.

5. The synchronizing signal selection circuit according to claim 1, wherein said control signal generation means comprises:

first pulse signal generation means for generating a first pulse signal in response to input of said vertical synchronizing signal, said first pulse signal ending when said first predetermined time period has elapsed after input of said vertical synchronizing signal;

second pulse signal generation means for generating a second pulse signal in response to input of said vertical synchronizing signal, said second pulse signal ending when said second predetermined time period has elapsed after input of said vertical synchronizing signal; and means for generating said control signal based on said first and second pulse signals.

6. The synchronizing signal selection circuit according to claim 1, wherein said control signal generation means comprises:

first pulse signal generation means for generating a first pulse signal in response to input of said vertical synchronizing signal, said first pulse signal ending when said first predetermined time period has elapsed after input of said vertical synchronizing signal;

second pulse signal generation means for generating a second pulse signal in response to an end of said first pulse signal, said second pulse signal ending when said second predetermined time period has elapsed after the end of said first pulse signal; and means for generating said control signal based on said first and second pulse signals.

7. The synchronizing signal selection circuit according to claim 1, further comprising phase-locked loop means, which receives an output of said selection means, for outputting a periodic pulse string as a clock signal to said control signal generation means.

8. The synchronizing signal selection circuit according to claim 7, wherein said phase-locked loop means comprises:

voltage controlled oscillator means for generating said clock signal;

frequency divider means, coupled to said voltage controlled oscillator, for dividing said clock signal;

phase comparator means, coupled to said selection means and said frequency divider means, for generating a phase comparison signal in accordance with the output of said selection means and said divided clock signal; and low-pass filter means, coupled to said phase comparator means, for filtering said phase comparison signal and outputting said filtered phase comparison signal to said voltage controlled oscillator.

* * * * *

UNITED STATES PATENT AND TRADEMARK OFFICE
CERTIFICATE OF CORRECTION

PATENT NO. : 5,245,431  Page 1 of 3
DATED     : Sep. 14, 1993
INVENTOR(S) : Okada et al It is certified that error appears in the above-indentified patent and that said Letters Patent is hereby corrected as shown below:

The title page showing the illustrative figure should be deleted to appear as shown on the attached page.

In the drawings Figure 1 should be deleted to be substituted per the attached page.

Signed and Sealed this

Nineteenth Day of July, 1994

Attest:

BRUCE LEHMAN

Attesting Officer  Commissioner of Patents and Trademarks

United States Patent [19]

Okada et al.

[11] Patent Number: 5,245,431
[45] Date of Patent: Sep. 14, 1993

[54] SYNCHRONIZING SIGNAL SELECTION CIRCUIT

[75] Inventors: Hisao Okada, Nara; Shigeyuki Uehira, Kashihara; Kuniaki Tanaka, Nara; Katumi Miki, Shiga; Miki Fukuyama, Nara, all of Japan

[73] Assignee: Sharp Kabushiki Kaisha, Osaka, Japan

[21] Appl. No.: 742,899

[22] Filed: Aug. 8, 1991

[30] Foreign Application Priority Data

Aug. 8, 1990 [JP] Japan .................................. 2-210608
Sep. 28, 1990 [JP] Japan .................................. 2-261482

[51] Int. Cl.⁵ ............................ H04N 5/10; H04N 5/8
[52] U.S. Cl. .................................. 358/154; 358/153; 358/155
[58] Field of Search ............... 358/148, 149, 150, 151, 358/152, 153, 154, 155, 158, 159, 160, 166, 167, 35, 36, 37, 236

[56] References Cited

U.S. PATENT DOCUMENTS

| | | | |
|---|---|---|---|
| 4,701,796 | 10/1987 | Kamiya | 358/153 |
| 4,709,268 | 11/1987 | Akimoto et al. | 358/148 |
| 4,772,950 | 9/1988 | Furuhata et al. | 358/158 |
| 4,792,857 | 12/1988 | Akiyama | 358/236 |
| 4,870,297 | 9/1989 | Karlock | 358/153 |
| 5,132,794 | 7/1992 | Okada et al. | 358/153 |

FOREIGN PATENT DOCUMENTS 1-298875 12/1989 Japan .

OTHER PUBLICATIONS

Translation of Abstract of Japanese Appln. No. 1-298875.

*Primary Examiner*—James J. Groody
*Assistant Examiner*—Michael H. Lee

[57] ABSTRACT

In a synchronizing signal selection circuit, in response to the input of a vertical synchronizing signal extracted from a composite synchronizing signal, a control signal is generated. The control signal is in a predetermined state during a period which begins when a first predetermined time period has elapsed after the input of the vertical synchronizing signal, and which terminates when a second predetermined time period has elapsed after the input of the vertical synchronizing signal. The composite synchronizing signal is output when the control signal is in the predetermined state, and a horizontal synchronizing signal separated the composite synchronizing signal is output when the control signal is in a state other than the predetermined state.

8 Claims, 14 Drawing Sheets

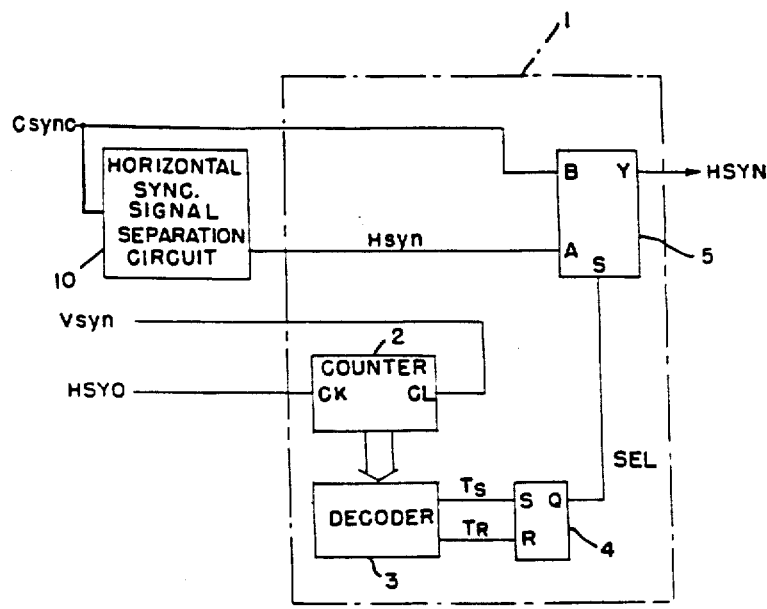

FIG.1

UNITED STATES PATENT AND TRADEMARK OFFICE
CERTIFICATE OF CORRECTION

PATENT NO. : 5,245,431
DATED : September 14, 1993
INVENTOR(S) : Okada, et al.

It is certified that error appears in the above-indentified patent and that said Letters Patent is hereby corrected as shown below:

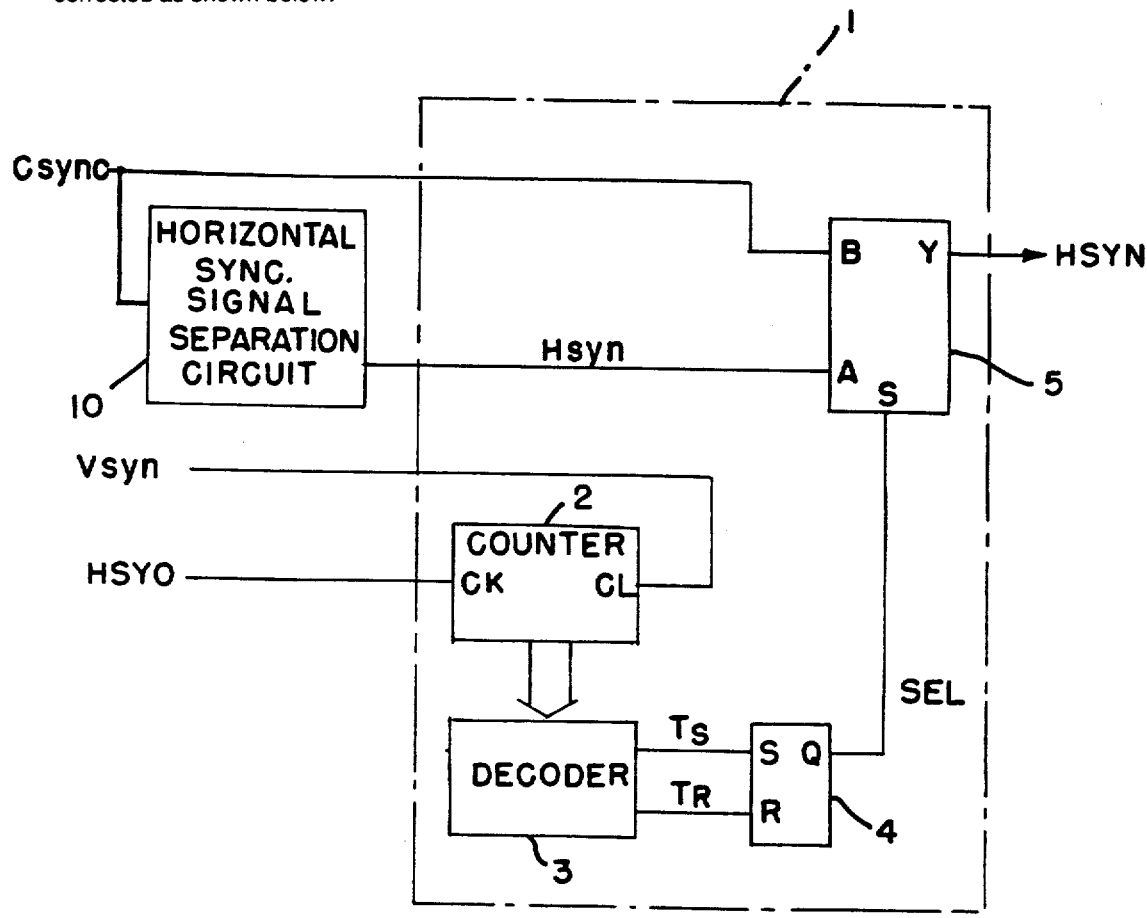

FIG. 1